United States Patent
Takikawa et al.

[11] Patent Number: 6,045,647
[45] Date of Patent: Apr. 4, 2000

[54] LAMINATING BLOW MOLDING METHOD USING SHIFTING MEMBERS

[75] Inventors: Naohisa Takikawa; Yoshiaki Kanoh, both of Yamaguchi, Japan

[73] Assignee: Ube Industries, Ltd., Ube, Japan

[21] Appl. No.: 09/026,515

[22] Filed: Feb. 19, 1998

Related U.S. Application Data

[62] Division of application No. 08/653,684, May 23, 1996, Pat. No. 5,804,127.

[30] Foreign Application Priority Data

| May 29, 1995 | [JP] | Japan | H7-130136 |
| Jul. 11, 1995 | [JP] | Japan | H7-174725 |
| Jul. 28, 1995 | [JP] | Japan | H7-192792 |
| Aug. 11, 1995 | [JP] | Japan | H7-205728 |
| Sep. 8, 1995 | [JP] | Japan | H7-230863 |
| Sep. 22, 1995 | [JP] | Japan | H7-244108 |

[51] Int. Cl.[7] .................................................. B29C 49/20
[52] U.S. Cl. ........................... 156/245; 264/515; 264/516
[58] Field of Search .................................. 264/515, 516; 156/245, 196

[56] References Cited

U.S. PATENT DOCUMENTS

| 5,194,305 | 3/1993 | Shirahara et al. | 264/515 |
| 5,232,653 | 8/1993 | Addeo et al. | 264/515 |

FOREIGN PATENT DOCUMENTS

| 57-102322 | 6/1982 | Japan | 264/515 |
| 57-160616 | 10/1982 | Japan | 264/515 |
| 60-122132 | 6/1985 | Japan | 264/515 |

*Primary Examiner*—Catherine Timm
*Attorney, Agent, or Firm*—Kanesaka & Takeuchi

[57] ABSTRACT

A laminating blow molding method for making a hollow article includes steps of: laminating a resin sheet on an outer surface of a parison extruded from a path between a die head and a core; sandwiching the parison with the resin sheet between a pair of mold pieces constituting a mold while heating the mold to a temperature exceeding softening temperatures of the resin sheet and the parison, one of the mold pieces having shifting members at side portions thereof; closing the mold so that the parison with the resin sheet is held inside the mold, and moving the shifting members to the other of the mold pieces so that overhangs at both ends of the parison and resin sheet are pressed rearwardly to shift rearwardly burrs which are pressed out from the mold; and blowing the parison to perform blow molding. Thereafter, the mold is cooled and the molded article is taken out. In the method, a front side of the molded article is formed smoothly.

5 Claims, 10 Drawing Sheets

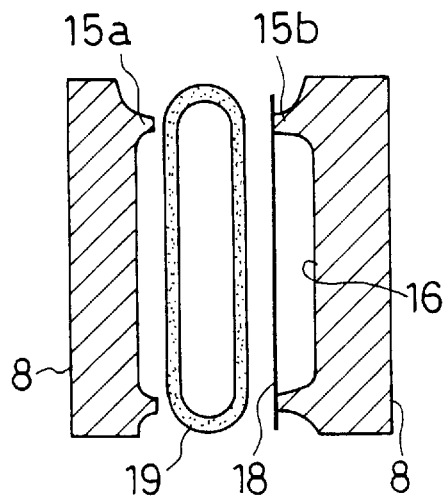
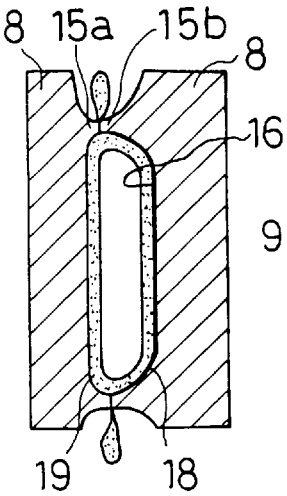
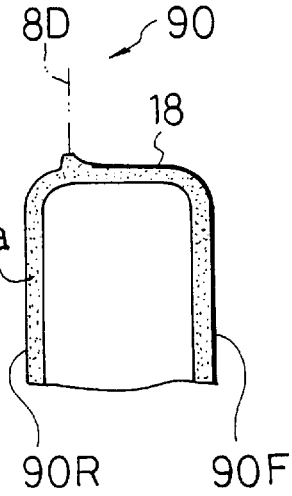
Fig. 18A  Fig. 18B  Fig. 18C
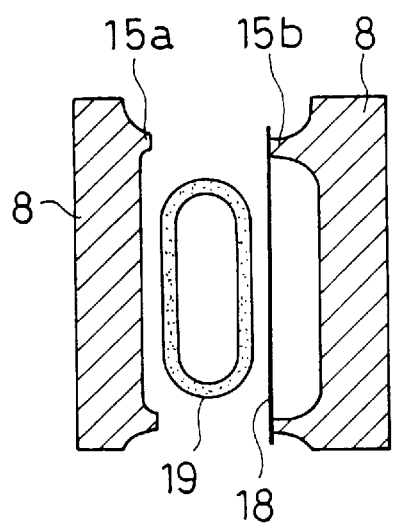
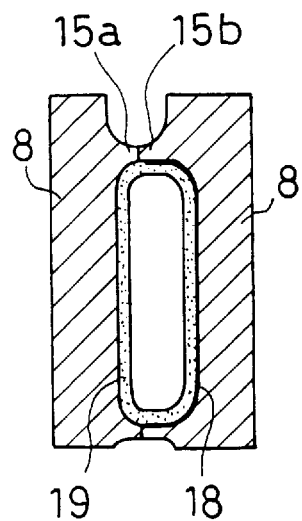
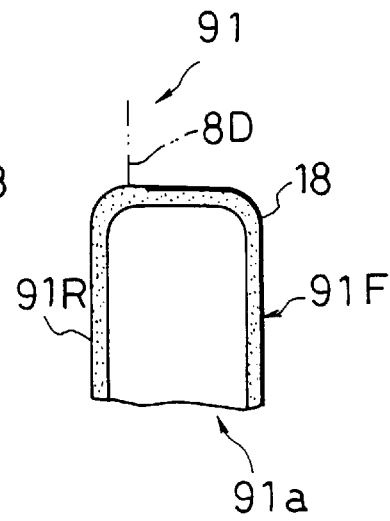
Fig. 19A  Fig. 19B  Fig. 19C

LAMINATING BLOW MOLDING METHOD USING SHIFTING MEMBERS

CROSS-REFERENCE TO RELATED APPLICATION

This is a divisional application of patent application Ser. No. 08/653,684 filed on May 23, 1996 now U.S. Pat. No. 5,804,127.

FIELD OF THE INVENTION AND RELATED ART STATEMENT

The present invention relates to a laminating blow molding method for forming a molded article in which a resin sheet is laminated on a surface of a parison and to the laminated blow-molded article, more particularly, to a laminating blow molding method whereby a molded article laminated with a resin sheet which looks fine on the outside and has high quality is formed and to the laminated molded article and a blow molding machine.

In a blow molding for forming a resin hollow article from a parison injected or extruded in a cylindrical configuration from a die head, the parison is injected or extruded from the die head, is formed in a bag-like configuration by a parison pinch, is previously blown to be inflated slightly, and is inserted in a mold which is opened. After that, the mold is closed. Air in a cavity formed between the mold and the parison is released and is sucked through small vent holes by a vacuum pump. Then, air with high pressure is blown in the parison to form the parison in a predetermined configuration corresponding to the configuration of the cavity. After that, the parison is cooled by the cooled mold. The molding is thus completed and the molded resin article is took out by opening the mold. FIG. 7 shows a conventional blow molding machine. The blow molding machine as shown in FIG. 7 is of a side feeding type in which melted resin is fed from one portion of a side of die head 2. The resin melted at high temperature is pressed out from the injection unit 4 and is extruded from a circular path 7 at the lowermost end, upon passing through a circular path formed between the die head 2 and the mandrel 3 via a feeding outlet 2*a*, thereby making a parison 24. The die head 2 is provided with a path 2*b* formed in a side at 180 degree to the feeding path 2*a*, and a valve 5 (or plug) disposed outside of the path 2*b*. A core 3*a* is connected to a rod 6*a* for controlling parison which pierces the mandrel 3. The core 3*a* is slightly moved up and down by the operation of a parison control cylinder 6. The space (gap) of a circular spacing path 7 can be varied to adjust the thickness of the parison 19.

On the other hand, a blow molded article a surface of which is laminated with a resin sheet has been produced conventionally by holding the resin sheet between an extruded parison and a cavity face of a mold and closing the mold by using such a blow molding machine 1.

However, such a conventional laminated blow-molded article has drawbacks; breakage of the resin sheet during blowing; appearance of wrinkles on a surface of a molded article whereby a smooth flat surface is ruined, and appearance of air sac on a surface of a molded article due to air trapped between the resin sheet and a surface of a parison whereby the resin sheet can not be bounded overall on the surface of the parison.

Therefore, there is a way to release air trapped between the resin sheet and the parison to closely bond the resin sheet to the surface of the parison by forming a plurality of fine holes in the resin sheet to be laminated and positively sucking air from the inside of the mold after closing the mold. However, in this case, there is also a drawback of remaining tracks of holes on the surface of the molded article, thereby spoiling the beauty of the molded article.

The value as goods of the laminated blow-molded article formed conventionally is low because it has a bad surface without gloss. In addition, in case of the resin sheet having a joint line, there is a problem that the joint line makes a step on the surface of the molded article whereby a smooth flat surface is ruined. There is also a problem that the adhesion between the resin sheet and the parison is weak because the back surface of the resin sheet is too smooth and flat.

Moreover, when the resin sheet is laminated on one side of the molded article, a section of the resin sheet laminated appears to a portion corresponding to a mold line of the molded article, thereby making its looking bad and decreasing the range of applications.

OBJECT AND SUMMARY OF THE INVENTION

It is an object of the present invention to solve the problems of the prior art as mentioned above and to obtain a high-quality laminated blow-molded article with smooth gloss and without track of hole.

It is another object of the present invention to provide a laminating blow molding method which can form a high-quality laminated blow-molded article having improved adhesion between a resin sheet and a surface of a parison and improved transfer characteristics.

It is further another object of the present invention to obtain a high-quality laminated blow-molded article with smooth gloss on which a section of a resin sheet is not noticeable and no wrinkle or air sac appears.

In an aspect of the present invention, a laminating blow molding method, for making a hollow article by laminating a resin sheet on an outer surface of a parison extruded from a circular resin path between a die head and a core mounted to a lower end of a mandrel and by sandwiching the parison with the resin sheet between a pair of right and left mold pieces constituting a mold, comprises steps of: forming 1 through 500 fine holes per an area of 100 cm$^2$ in the resin sheet by punching, the diameter of the holes being between 0.1 mm and 1 mm; disposing the resin sheet so that its surface having projections as burrs of the fine holes formed by punching faces a cavity face of the mold and closing the mold with the resin sheet being held between the cavity face of the mold and the surface of the parison; heating the mold to a temperature exceeding the softening temperature softening the surface of the resin sheet at the same time of performing blowing, after that, cooling the mold to a temperature enough to take out a molded article; and taking out the molded article.

In this aspect, the resin sheet is provided with fine holes in the surface thereof, is arranged so that its surface having projections as burrs of the fine holes formed by punching faces a cavity face of the mold, and is pulled down to be stretched. In this state, the mold is closed and then the resin sheet is pressed on the cavity face of the mold, which is heated about the softening temperature of the resin, through the parison which is blown so that the resin sheet is softened or melted, thereby forming a laminated blow-molded article with high glowness and high transfer characteristics.

In another aspect of the present invention, a laminating blow molding method, for making a hollow article by laminating a resin sheet, having a softening temperature different from that of a parison, on an outer surface of the parison extruded from a circular resin path between a die head and a core mounted to a lower end of a mandrel and by sandwiching the parison with the resin sheet between a pair of right and left mold pieces constituting a mold, comprises steps of: closing the mold with the resin sheet being held between a cavity face of the mold and the surface of the parison; heating the mold to a temperature exceeding the higher one of the softening temperatures of the parison and of the resin sheet at the same time of performing blowing, after that, cooling the mold to a temperature enough to take out a molded article; and taking out the molded article.

As described above, the temperature on the surface of the mold is controlled, thereby providing strong adhesion between the parison and the resin sheet.

In another aspect of the second invention, a laminating blow molding method, for making a hollow article by laminating a resin sheet on an outer surface of a parison extruded from a die and by sandwiching the parison with the resin sheet between a pair of right and left mold pieces constituting a mold, comprises steps of: processing the resin sheet to have a back surface of the parison side with roughness from 1 $\mu$m to 100 $\mu$m; disposing the resin so as to face to a cavity face of the mold and closing the mold with the resin sheet being held between the cavity face of the mold and the surface of the parison; heating the mold to a temperature exceeding the softening temperature softening the surface of the resin sheet at the same time of performing blowing, after that, cooling the mold to a temperature enough to take out a molded article; and taking out the molded article.

In this aspect, a laminating blow molding method, for making a hollow article by laminating a resin sheet on an outer surface of a parison extruded from a circular resin path between a die head and a core mounted to a lower end of a mandrel and by sandwiching the parison with the resin sheet between a pair of right and left mold pieces constituting a mold, comprises steps of: heating the mold to a temperature exceeding the higher one of the softening temperatures of the parison and of the resin sheet and performing the blowing, releasing air about a cavity face of the mold, after that, cooling the mold to a temperature enough to take out a molded article, and taking out the molded article, and wherein a mold line of the mold is formed in a position shifted rearwardly from the center of a molded article in the cross direction, and when closing the mold, overhangs at the both ends of the mold of the parison and the resin sheet laminated to the parison are pressed rearwardly to shift rearwardly burrs which are pressed out from the mold.

The method of the second aspect of the present invention is automatically and mechanically performed by a blow molding machine comprising an injection unit, a die assembly for extruding, as a parison, melted resin fed from the injection unit, and a mold comprising a pair of mold pieces for sandwiching a parison to be blow-molded, wherein the mold pieces are formed so that a mold line of the mold is formed in a position shifted rearwardly from the center of a molded article in the cross direction and are each provided with a medium path therein for heating or cooling the mold, a plurality of vent holes passing through the mold from a cavity face thereof, and an exhauster connecting to the vent holes; one of the mold pieces is provided with a roll onto which the resin sheet is wound so that the resin sheet extends downward between the cavity face of the mold piece and the parison when the mold is opened; and the mold piece is provided with pivotal flappers or movable slide cores disposed on both ends of the mold piece to rearwardly. press burrs, pressed out from the mold, and the resin sheet laminated to the parison.

In the second aspect of the present invention, the cavity face of the mold is heated to the temperature exceeding the higher one of the softening temperatures of the parison and the resin sheet and blowing is performed releasing air about the cavity face. After that, the mold is cooled to the temperature enough to take out a molded article; and taking out the molded article. Since the mold pieces are formed so that mold line of the mold is formed in a position shifted rearwardly from the center of a molded article in the cross direction, deaeration is performed sufficiently during blowing. In addition, since the mold is heated up to the temperature exceeding the higher one of the softening temperatures of the parison and the resin sheet, the parison and the resin sheet are melted to be integrated and the surface of the resin sheet is highly transferred with the cavity face of the mold, thereby making a good-looking improved molded article with a smooth surface on which no defect appears.

In another aspect of the present invention, a laminating blow molding method, for forming an article by temporarily bounding a resin sheet, which is previously cut in a predetermined size, to one of right and left mold pieces, and then laminating the resin sheet to a parison by sandwiching the resin sheet and the parison between the mold pieces a mold line of which is formed in a position shifted rearwardly from the center of a molded article in the cross direction, comprises steps of: heating the mold to a temperature exceeding the higher one of the softening temperatures of the parison and of the resin sheet and performing the blowing, releasing air about a cavity face of the mold; and after that, cooling the mold to a temperature enough to take out a molded article, and taking out the molded article.

Since deaeration is performed sufficiently during blowing and the mold is heated up to the temperature exceeding the higher one of the softening temperatures of the parison and the resin sheet, the parison and the resin sheet are melted to be integrated and the surface of the resin sheet is highly transferred with the cavity face of the mold, thereby making a good-looking improved molded article with a smooth surface on which no defect appears.

In the present invention, the color of the resin sheet is allowed to be selected or a resin sheet on which a pattern and/or character is printed can be employed, thereby making a molded article with variable design.

Variable products can be made by inserting inorganic material such as a metal plate, a sheet of metallic foil, glass, ceramic, and stone, organic material such as leather, paper, and wood, or a combination of these materials between the back surface of the resin sheet and the surface of the parison.

BRIEF DESCRIPTION OF THE DRAWINGS

FIGS. 18A, 18B, and 18C are explanatory views showing the process of laminating molding in a method that a burr appears all around the periphery of the article;

FIGS. 19A, 19B, and 19C are explanatory views showing the process of laminating molding for a small-diameter parison whereby no burr appears.

DESCRIPTION OF THE PREFERRED EMBODIMENTS

Figure 1:
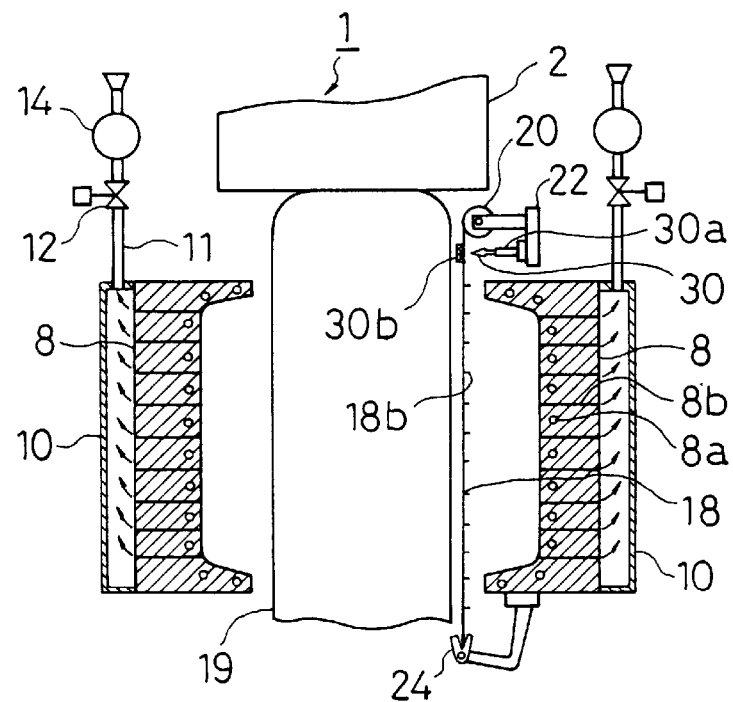
FIG. 1 is a whole longitudinal sectional view of a blow molding machine according to an embodiment of the present invention.
Figure 2:
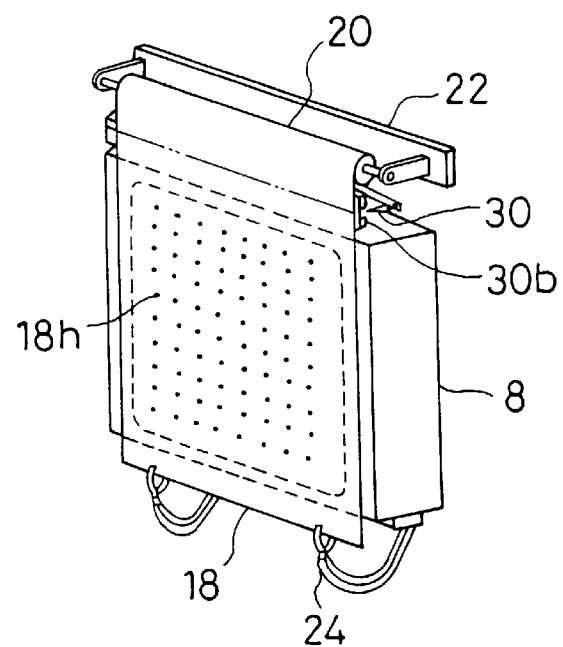
FIG. 2 is a perspective view of the blow molding machine according to the embodiment of the present invention.
Figure 3:
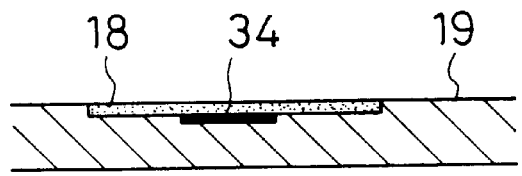
FIG. 3 is a sectional view of a laminated blow-molded article showing the surface condition thereof according to the embodiment of the present invention.
Figure 4:
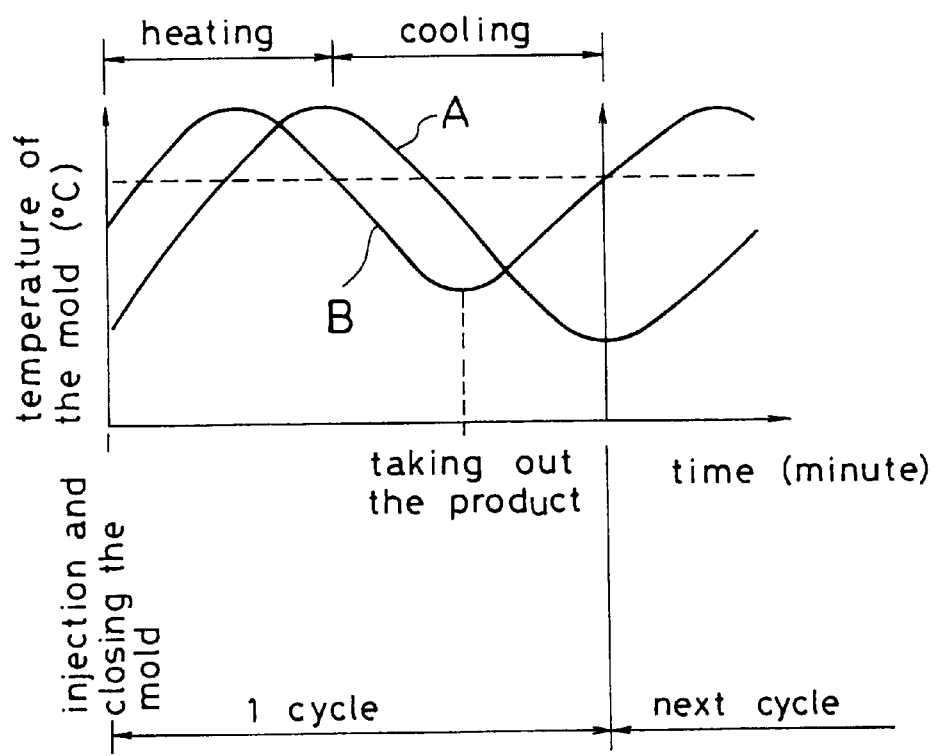
FIG. 4 is a graph for explaining the variation in temperature of mold pieces used in a blow molding method according to the embodiment of the present invention.
Figure 5A:
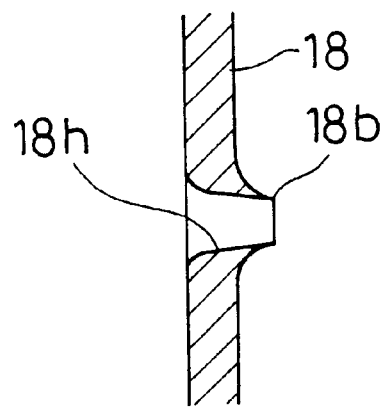
FIGS. 5A and 5B are enlarged sectional views of resin sheets before and after laminated on a surface of a parison, respectively, in the blow molding method according to the embodiment of the present invention.
Figure 5B:
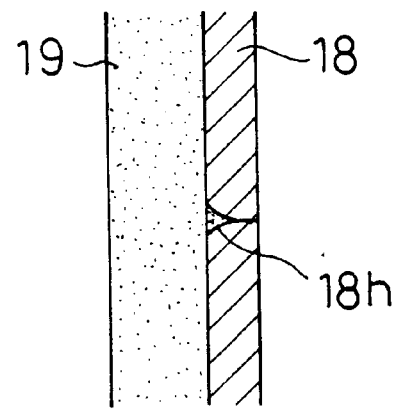
Figure 6A:
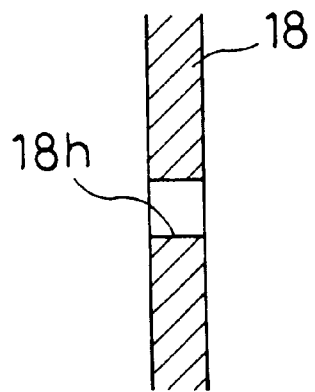
FIGS. 6A and 6B are enlarged sectional views of a conventional resin sheets before and after laminated on a surface of a parison, respectively, in a conventional blow molding method.
Figure 6B:
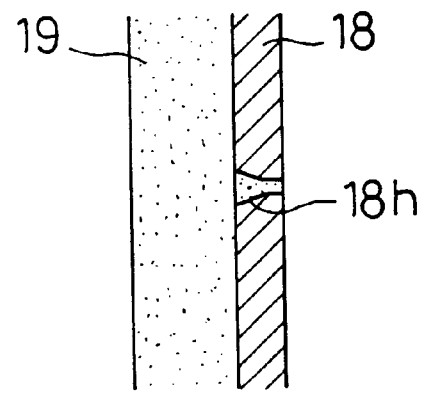
Figure 7:
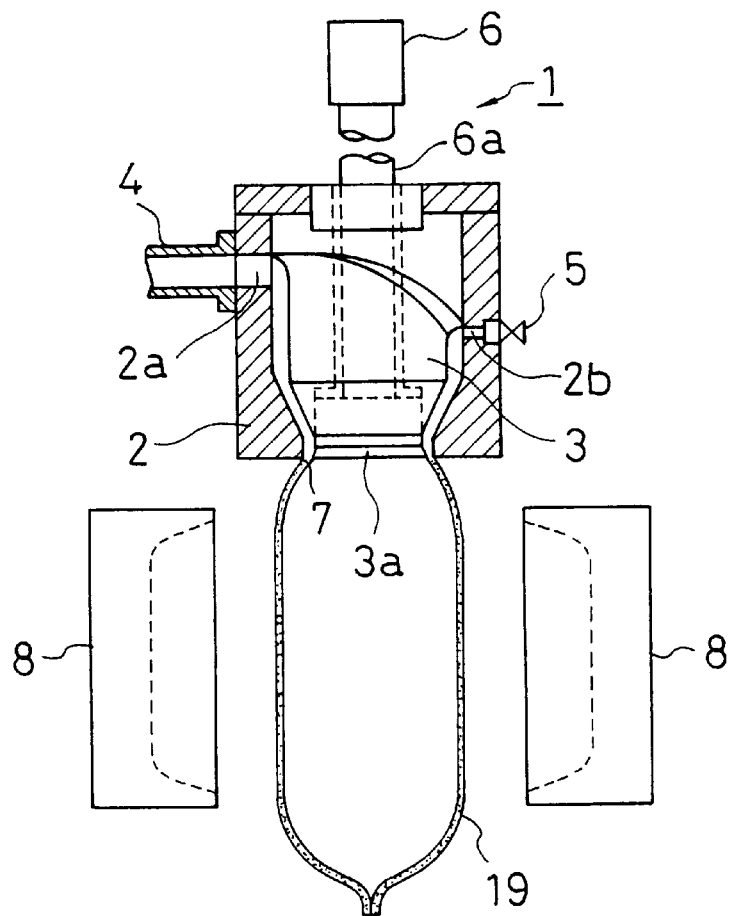
FIG. 7 is a whole longitudinal sectional view of a conventional blow molding machine.
Figure 8:
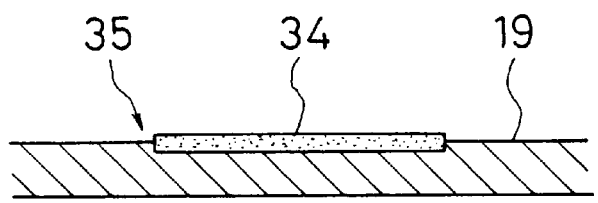
FIG. 8 is a sectional view of a conventional laminated blow-molded article showing the surface condition thereof.

Hereinafter, the details of embodiments of the present invention will be described with reference to attached drawings. FIG. 1 through FIG. 5 are related to an embodiment of the present invention, FIG. 1 is a whole longitudinal sectional view of a blow molding machine, FIG. 2 is a perspective view of the blow molding machine, FIG. 3 is a sectional view of a laminated blow-molded article showing the surface condition thereof, FIG. 4 is a graph for explaining the variation in temperature of mold pieces used in a blow molding method according to the embodiment of the present invention, and FIGS. 5A and 5B are enlarged sectional views of a resin sheet before and after laminated on a surface of a parison, respectively, in the blow molding method according to the embodiment of the present invention. FIGS. 6A and 6B show a conventional resin sheet before and after laminated on a surface of a parison, respectively.

In FIG. 1 and FIG. 2, the blow molding machine 1 has a die head 2, a mold comprising a pair of right and left mold pieces 8, 8, disposed below the die head 2, free to come in contact with each other and space apart from each other, a roll 20, disposed above one of the mold pieces 8, onto which the resin sheet 18 is wound so that the resin sheet 18 extends downward along the surface of a parison 19 which is extruded downward from the die head 2, and a rolling stand 22 which supports the roll 20. The blow molding machine 1 also has a cutter 30 formed by a sharp-edged tool which is controlled by an air cylinder 30a to move forward and backward horizontally toward the parison 19, a cutter base 30b which is disposed in front of the cutter and has a groove into which the edge of the cutter 30 is inserted whereby the resin sheet 18 is cut anytime without damaging the surface of the parison 19, and a sheet clip 24 disposed below the mold piece 8 to clip the lower end of the resin sheet 18 to keep the resin sheet 18 to be extended vertically downward during operation.

On the other hand, each mold piece 8 is provided with medium paths 8a formed in an area facing the cavity face of the mold piece 8 for heating and cooling the cavity face of the mold piece 8 upon switching heating medium and cooling medium as necessary. The medium paths 8a are connected to a medium (heating or cooling medium) switching supplier. Each mold piece 8 is also provided with vent holes 8b suitably spaced apart from each other and passing through the mold piece 8 perpendicularly to the cavity face thereof to release air, a suction duct 10 disposed to cover the outside of the mold piece 8 to suck air released from the vent holes 8b, and an exhaust pipe 11 comprising a solenoid valve 12 and a suction fun 14. Alternatively, the mold pieces 8 may be formed by porous metal, i.e. metal infinitely provided with fine air holes, instead of providing with vent holes 8B.

The resin sheet 18 wound onto the roll 20 may be formed from the same-kind resin of the parison 19 or resin different from the parison 19. The resin sheet 18 may be formed of a multi-layer resin sheet, resin sheets with a sheet of metallic foil, paper or glass fiber sandwiched therebetween, or a resin sheet including inorganic material (such as glass fiber, inorganic compound). However, the resin sheet 18 is preferably made of the same-kind material of the parison because sheet materials stuck to the burr may be reused in the next shot. The thickness of the resin sheet 18 is normally less than 1 mm, preferably less than 0.5 mm, since a thick sheet is not preferable for making a laminated molded article. When the resin sheet 18 is too thick, it is difficult to make an article fitting the cavity in case of making a deep configuration which is wrinkly and it needs long time to cool the article after molding, thereby reducing the productively. On the other hand, when the resin sheet 18 is too thin, it is likely to be damaged during molding. The resin sheet 18 is provided with fine holes 18h formed in the surface thereof to release air existing between the parison 19 and the resin sheet 18. The fine holes 18h are arranged in a checked pattern or a zigzag pattern as shown in FIG. 2.

The diameter of the fine holes 18h is between 0.1 mm and 1 mm, preferably between 0.1 mm and 0.3 mm because when the diameter is less than 0.1 mm, it is difficult to release air therefrom and when the diameter is more than 0.3 mm, it is likely that tracks of the holes remain on the molded article. The number of the fine holes is at least $1/100$ cm$^2$, preferably between $4/100$ cm$^2$ and $500/100$ cm$^2$. The lower limit of the density ($1/100$ cm$^2$) is defined by the minimum area to be exhausted and the upper limit of the density ($500/100$ cm$^2$) is defined because even when the resin sheet 18 has more holes, the effect of releasing should be the same.

When the resin sheet 18 to be laminated to the surface of the parison 19 is a long, narrow piece of resin sheet, i.e. a ribbon-like resin sheet, the fine holes 18h are not necessary (the existing air escapes from the right and left ends of the ribbon-like resin sheet).

The pressure of blowing after closing the mold is at least 39.2N (4 kgf/cm$^2$) to completely release air existing between the parison 19 and the resin sheet 18 laminated on the surface of the parison 19 so as to prevent the article from including air sacs.

The temperatures for heating and cooling the mold pieces 8 are suitably selected according to the kind of the resin of the surface of the resin sheet 18 to be in contact with the mold 8. That is, the resin sheet 18 is normally formed by extrusion molding so that the surface of the resin sheet 18 is not so good. Therefore, for improving the surface of the laminated blow-molded article, i.e. for improving the transfer characteristics of the molded article, the resin sheet is heated to a temperature higher than the softening temperature of resin and is cooled quickly after the transfer is completely finished. It should be noted that it is also necessary to heat the parison to a temperature higher than the softening temperature of the resin of the parison.

The softening temperature of resin is equal to the glass-transition temperature in case of amorphous resin, the softening temperature of ABS (Acrylonitrile Butadiene Styrene) resin ranging from 110° C. to 130° C. and the softening temperature of modified PPO (Polyphenylene Oxide) resin ranging 120° C. to 140° C.

In case of crystalline resin, the range of temperature between crystallization and the melting point is proper, the softening temperature of PP (Polypropylene) ranging from 130° C. to 160° C., the softening temperature of PE (Polyethylene) ranging 100° C. to 130° C., and the softening temperature of nylon 6 ranging from 180° C. to 230° C.

On the other hand, the cooling temperature ranges from about 80° C. to about 100° C. As shown in FIG. 4, there are two ways, indicated by a temperature curve A and a temperature curve B, in temperature change of mold pieces during one blow molding, either of which may be used. The way of temperature curve A is called as "Cool Starting Method" in which the temperature of the mold is low during injecting the parison 19 and closing, while the way of temperature curve B is called as "Hot Starting Method" in which the temperature of the mold is high during injecting the parison 19 and closing.

The heating medium and the cooling medium may be various kinds of oil, water, power water (steam). It is preferable that the same materials with different temperatures are used both as the heating medium and the cooling medium.

Instead of heating and cooling the mold 8 as mentioned above, the parison 19 may be directly heated from outside by a light source or heat source.

The surface of the resin sheet 18 to be in contact with the parison 19 may be previously applied with an adhesive material thereon, or applied with liquid adhesive by spaying or putting it with a brush, thereby smoothly coming in contact with the parison 19 during molding.

The description will now be made as regard to the operation of the blow molding method of the present invention for the blow molding machine as structured above.

First, with the mold being kept in the opened state, the resin sheet 18 is unwound from the roll 20 downward and the lower end of the resin sheet 18 is clipped by the sheet clips 24 so that the resin sheet 18 is stretched vertically. Then, the parison 19 is extruded from the lower end of the die head 2 by an extruder. On the other hand, the mold pieces 8, 8 are heated along either of the temperature curve A or B shown in FIG. 4.

Next, the mold is closed, an upper portion of the resin sheet 18 is cut by the cutter 30 hollizontally, and the molding is performed with the resin sheet 18 laminated on the surface of the parison 19. The temperature about the cavity of the mold pieces 8, 8 becomes the softening temperature of the resin sheet 18 so that the surface of the resin sheet 18 is softened and pressed to the cavity face of the mold to transfer the cavity face to the resin sheet 18 and the surface of the parison 19 and the surface of the resin sheet 18 are pressed each other to be integrated by pressurized air blown into the parison 19 through a blow pin.

In case of the resin sheet 18 having flat surface without burr of fine holes 18h as shown in FIG. 6A, it is likely that tracks of the holes remain on the molded article even as shown in FIG. 6B after laminating molding, spoiling the beauty of the molded article.

For improving this problem, according to the present invention, the fine holes 18h of the resin sheet 18 are formed by punching, for example, press working. As a result, the resin sheet 18 is provided with a projection 18b formed around each fine hole 18h on one side thereof, as shown in FIG. 5A. With the side of the resin sheet 18 on which the projections 18b are formed to face the surface of the mold, the resin sheet 18 is disposed between the surface of the mold piece 8 and the surface of the parison 19 and then pressed so that the projections 19b are squashed. As a result of this, the fine holes 18h are filled, thereby making the molded article without track of holes.

The resin sheet 18 used in the laminated blow-molded article of the present invention may be a normal commercial resin sheet or an extruded sheet with one side (the blow-molded article surface side) on which a pattern and/or character is printed, such as an ABS extruded sheet, thereby making various molded article with any color and/or any pattern in addition to high glossiness.

The uses of the article molded as above are:

(1) daily necessities (such as a chair, a television stand, a bookshelf, a cabinet for kitchen equipment, a blackboard, a storage, a top plate of a desk, a top plate of a kotastu, a door for furniture, a side plate, a bathtub, a dresser, etc.);

(2) electric appliances (such as a door of a refrigerator, a door of a dishwasher, a door of a washing machine, a side plate of a washing machine, a television set, a box frame of a speaker, a housing of a computer, etc.);

(3) car equipments (a spoiler, a door of a glove box, an instrument panel, a rear partial shelf, a door trim board, a side garnish, a console box, a floor, a bumper, a fender trunk rid, a fender of a motorbike, an outside plate, etc.);

(4) building materials (a door, wall material, a partition plate, a screen, etc.); and (5) miscellaneous goods.

In addition, the molded article may be used as a floor panel allowed to be heated by inserting a sheet of metallic foil 34 into the inside of the resin sheet 18 on the parison side as shown in FIG. 3, and the uses are widened to car equipment such as a spoiler with a built-in antenna, a door of a glove box, interior parts, etc. further by connecting the sheet of metallic foil 34 to a wire. By combining with insert molding, foaming, etc. of prior art, the uses of the molded article is further widened.

According to the method of the present invention, the mold is heated when closed in blow molding so that the resin sheet 18 is softened in the half-melted state and, thereby making a flat surface without step like a step 35 of a laminated molded article formed in a conventional method.

The fine holes 18$h$, the diameter of which is smaller than 0.3 mm, formed in the resin sheet 18 are naturally squashed to be closed after releasing air by melting of the surface of the resin sheet with the heated mold so that a lot of pores do not remain in the article and thus the quality of the article is not reduced. However, it is preferable that the fine holes 18$h$ are formed by punching to have projections 18$b$ whereby erasing tracks of holes after laminating.

When the materials of the parison and of the resin sheet are different from each other and the softening temperature of the parison is higher than that of the resin sheet, it is not enough that the surface of the mold is heated up to a little higher than the softening temperature of the resin sheet, so that it is hard to make an article with high transfer characteristics and high quality.

That is, when the softening temperatures of the parison and of the resin sheet are different from each other, the surface of the mold is preferably heated up to a temperature exceeding the higher one of the temperature.

Table 1 shows a result of observing surfaces of the molded article, spoilers as one of car equipment, and measuring its glossiness at various temperatures.

As shown in Table 1, in Comparative Example 1 in which an article is molded with the surface of the mold being at a temperature higher than the softening temperature of the resin sheet and lower than the softening temperature of the parison, wrinkles and air sacks appear on the surface of the article, while, in any one of Examples 1 through 3 in which the surface of the mold is heated up to temperature exceeding both of the softening temperatures, an article with high transfer characteristics and high quality is obtained.

TABLE 1

|  | Example 1 | Example 2 | Example 3 | Comparative E. 1 |
|---|---|---|---|---|
| S.T of parison | 140° C. | 120° C. | 120° C. | 140° C. |
| S.T of resin sheet | 120° C. | 140° C. | 120° C. | 120° C. |
| T of heated mold | 150° C. | 150° C. | 125° C. | 125° C. |
| T of cooled mold | 100° C. | 100° C. | 100° C. | 100° C. |
| N of holes in sheet/100 cm$^2$ | 100 | 100 | 100 | 100 |
| Surface condition | good | good | good | wrinkles, air sacks |
| Glossiness | more than 90 | more than 90 | more than 90 | tracks of holes remain |

S.T = Softening Temperature, T = Temperature, N = Number

Hereinafter, another embodiment of the present invention will be descried with reference to FIG. 9 through FIGS. 13A and 13B.

Figure 9:
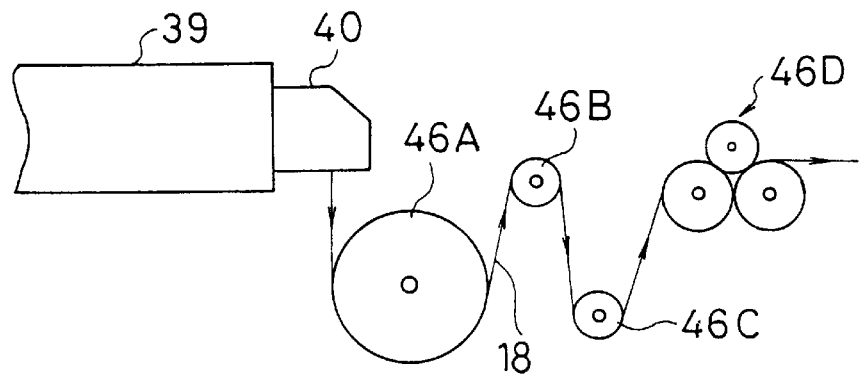
FIG. 9 is a schematic diagram of the resin sheet extruded by an extruder die.
Figure 10:
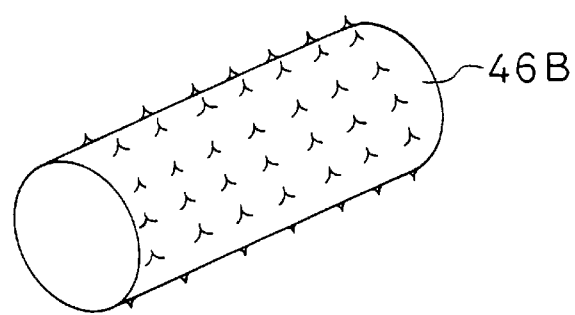
FIG. 10 is a perspective view of a wind-up roll for the resin sheet.
Figure 11:
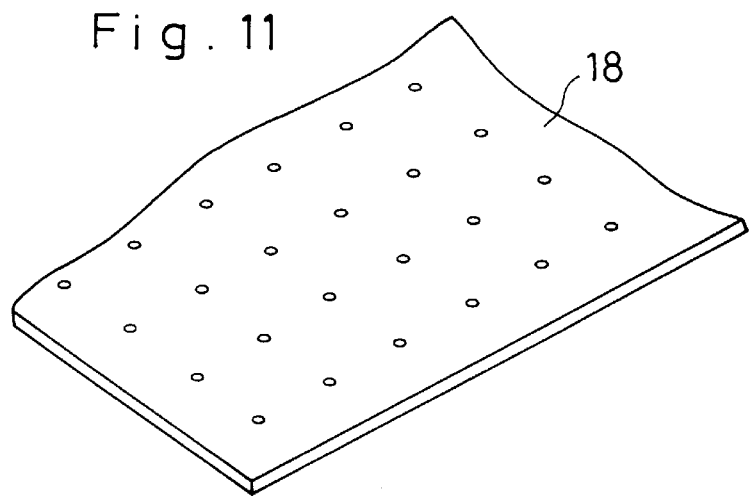
FIG. 11 is a partial perspective view of the resin sheet with holes formed by needle-like projections disposed on the wind-up roll.
Figure 12:
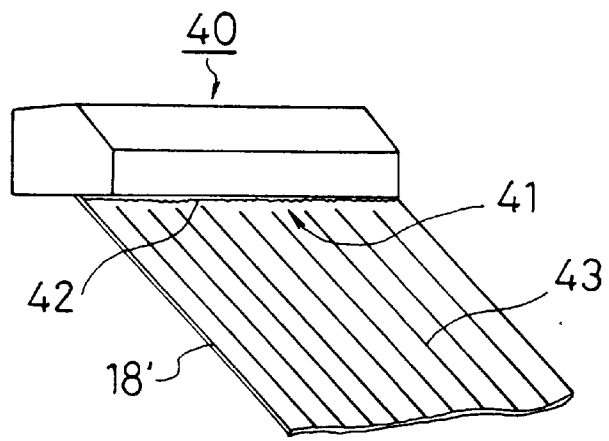
FIG. 12 is an explanatory view showing the resin sheet extruded by an extruder die with wave pattern.
Figure 13A:
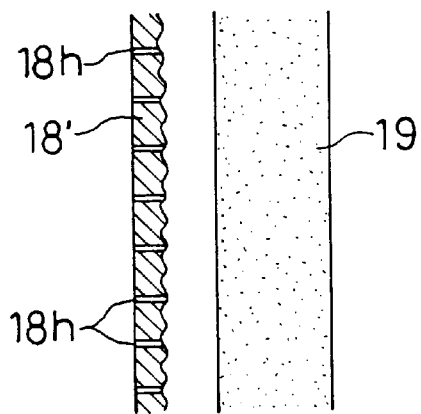
FIGS. 13A and 13B are explanatory views showing a condition of laminating between the resin sheet with wave pattern and the parison.
Figure 13B:
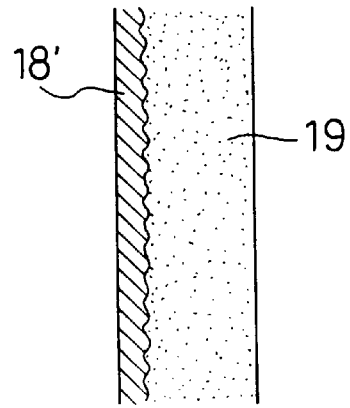

FIG. 9 is a schematic view of the resin sheet extruded from an extruder die, FIG. 10 is a perspective view of a wind-up roll for the resin sheet, FIG. 11 is a partial perspective view of the resin sheet with holes formed by needle-like projections disposed on the wind-up roll, FIG. 12 is an explanatory view showing the resin sheet extruded by an extruder die with wave pattern, and FIGS. 13A and 13B are explanatory views showing a condition of laminating between the resin sheet with wave pattern and the parison.

For increasing the bonding strength between the resin sheet 18' wound onto the roll 20 and the parison, as shown in FIG. 12, the extruder die 40 of an extruder 39 is provided with a wave-like cutter 42, in which the height is between 1 $\mu$m and 100 $\mu$m, disposed at an outlet portion 41 thereof so that the resin sheet 18' having a predetermined thickness is extruded form the extruder die 40 with die lines 43 from 1 $\mu$m to 100 $\mu$m being formed on the rear surface of the resin sheet 18' (to be in contact with the parison 19).

The reason of forming the die lines 43 from 1 $\mu$m to 100 $\mu$m on the rear surface of the resin sheet 18' is to obtain an anchor effect whereby the bonding strength of the resin sheet 18' to be bonded to the surface of the parison 19 by pressing is increased. The resin sheet 18' is different from a conventional sheet which has flat surface with no die line to improve its surface. The height of the die lines 43 is between 1 $\mu$m and 100 $\mu$m, preferably between 5 $\mu$m and 30 $\mu$m, which is defined from data obtained by experiments, since the bonding strength differs according to the kinds of resin of the resin sheet 18' and of the parison 19 to obtain an anchor effect.

The resin sheet 18' with die lines 43 of less than 1 $\mu$m has little anchor effect like the conventional resin sheet with a flat surface, while the resin sheet 18' with die lines 43 of more than 100 $\mu$m facilitates appearance of wrinkles on the molded article since the unevenness of the surface by the die lines 43 is outstanding. Therefore, it is preferable that the height of die lines 43 is between 1 $\mu$m and 100 $\mu$m.

On the other hand, the resin sheet 18' extruded from the extruder die 40 is reformed to have a predetermined thickness by passing through rolls 46A through 46D arranged upward and downward in a zigzag arrangement, as shown in FIG. 9. By securing a plurality of needle-like projections 44 to the outer surface of the roll 46B so that the needle-like projections 44 are arranged at predetermined spaces, for example, as shown in FIG. 10, the resin sheet 18' is provided with fine holes 18$h$ automatically by the needle-like projections 44 when the resin sheet 18' passes through the roll 46B, thereby simplifying the process.

Another embodiment of the present invention will now be made as regard to FIGS. 14A, 14B, and 14C through FIG. 16.

Figures 14A, 14B, 14C:
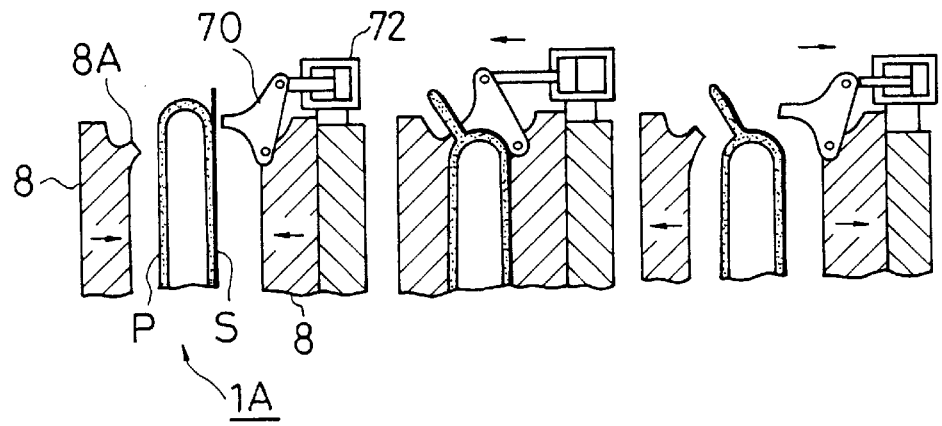
FIGS. 14A, 14B, and 14C are schematic plan views showing the process of a laminating blow molding method in a flapper-type blow molding machine according to an embodiment of the present invention.
Figures 15A, 15B, 15C:
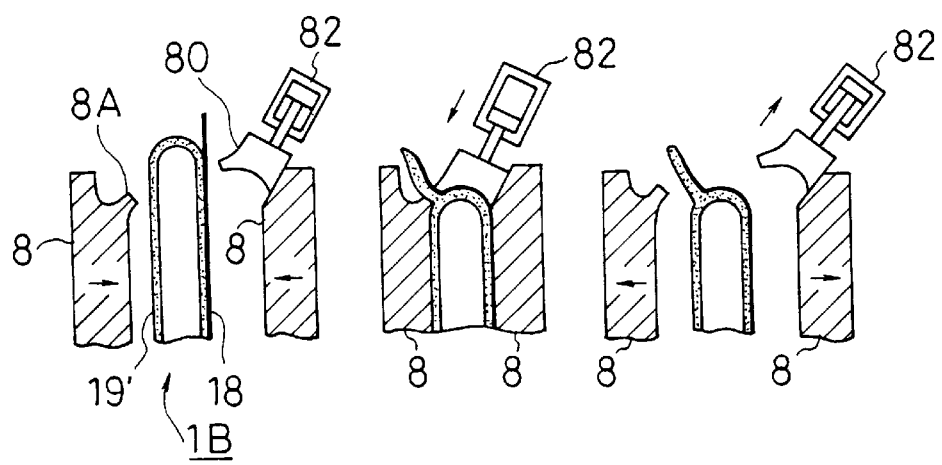
FIGS. 15A, 15B, and 15C are schematic plan views showing the process of a laminating blow molding method in a slide-core-type blow molding machine according to an embodiment of the present invention.
Figure 16:
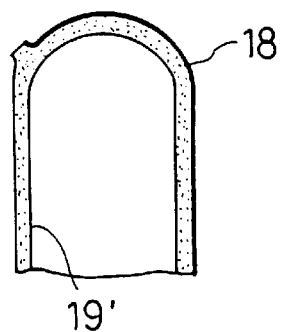
FIG. 16 is a partial plan sectional view of a laminated blow molding article formed by the blow molding method according to the embodiment of the present invention.

FIGS. 14A, 14B, and 14C are schematic plan views showing the process of a laminating blow molding method in a flapper-type blow molding machine according to an embodiment of the present invention, FIGS. 15A, 15B, and 15C are schematic plan views showing the process of a laminating blow molding method in a slide-core-type blow molding machine according to an embodiment of the present invention, and FIG. 16 is a partial plan sectional view of a laminated blow molding article formed by the blow molding method according to the embodiment of the present invention.

In the present invention, the mold pieces 8, 8 are formed so that a mold line of the molded article, i.e. a parting line, is shifted rearwardly from the center of the molded article in the thickness direction, for example, as shown in FIGS. 14A and 15B.

For shifting the mold line rearwardly from the center, in a flapper-type blow molding machine 1A of the present invention shown in FIGS. 14A through 14C, the rear-side mold piece 8 is provided with a tilt overhang 8A, with a rounded face coming into contact with the parison, at the end thereof, and the front-side mold piece 8 is provided with a flapper 70 which can be pivoted by the operation of an air cylinder 72, at the end thereof. In this arrangement, the burr portions of parison 19' and of the resin sheet 18 are shifted by pivoting the flapper 70 in the counterclockwise direction of FIG. 14B after closing the mold.

In a blow molding machine 1B as shown in FIGS. 15A through 15C, the front-side mold piece 8 is provided with a slide core 80 which is movable by the operation of an air cylinder 82, instead of the flapper 70. Also in this arrangement, the same operation is performed.

The description will now be made as regard to a blow molding method of the present invention used in the blow molding machine 1A or the blow molding machine 1B as structured above.

First, with the mold being kept in the opened state, the resin sheet 18 is unwound from the roll 20 downward and the lower end of the resin sheet 18 is clipped by the sheet clips 24 so that the resin sheet 18 is stretched vertically. Then, the parison 19' is extruded from the lower end of the die head 2 by an extruder. On the other hand, the mold pieces 8, 8 are heated along either of the temperature curve A or B shown in FIG. 4.

After that, the mold closes, an upper portion of the resin sheet 18 is cut by the cutter 30 hollizontally, and the molding is performed with the resin sheet 18 being laminated on the surface of the parison 19'.

That is, in the blow molding machine 1A, after closing the mold and integrating the parison 19' and the resin sheet 18, the flapper 70 is pivoted to shift the burrs rearwardly as shown in FIGS. 14B and 14C.

Similarly, in the blow molding machine 1B, the slide core 80 is moved forward to shift the burrs rearwardly as shown in FIGS. 15B and 15C.

Further another embodiment of the present invention will now be made as regard to FIGS. 17 through 19.

Figure 17:
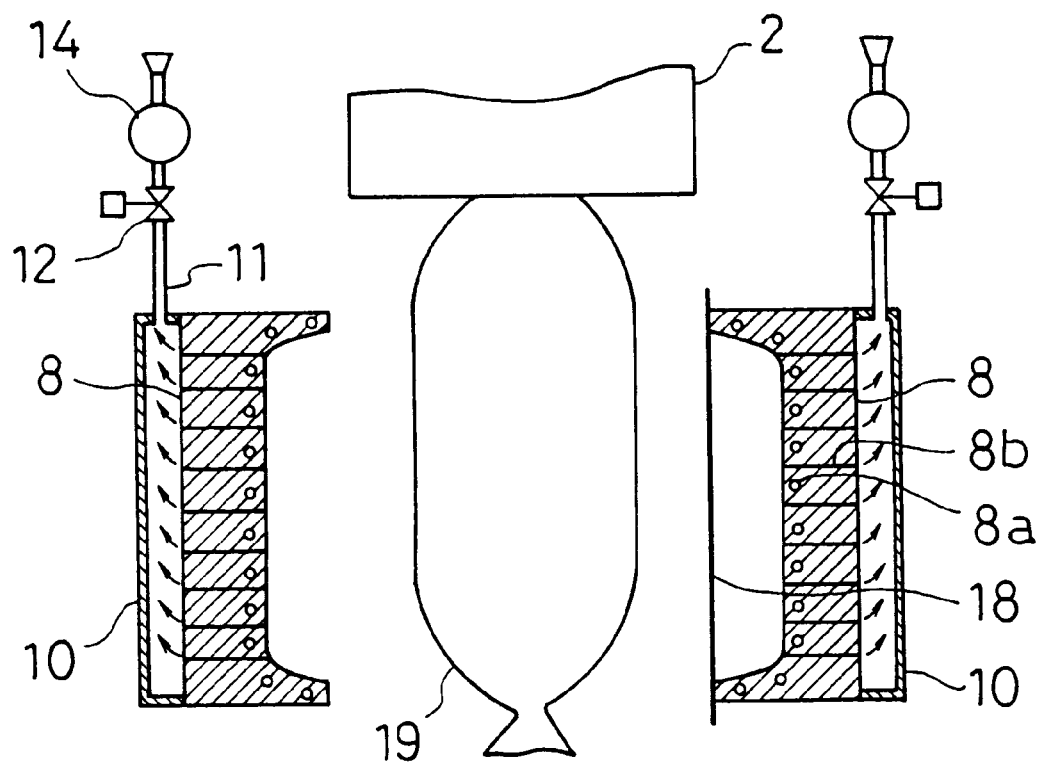
FIG. 17 is a whole longitudinal sectional view of a blow molding machine according to an embodiment of the present invention.
Figure 20A:
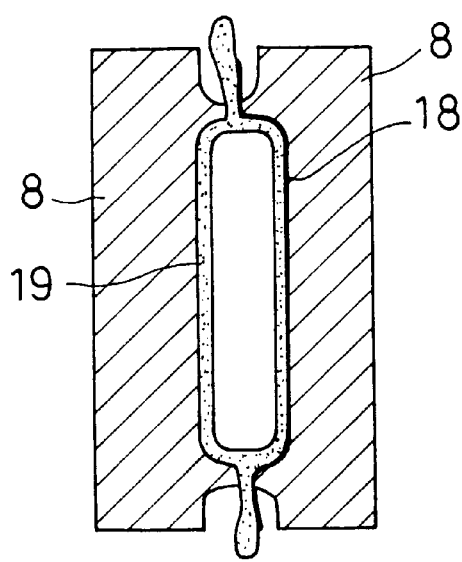
FIGS. 20A and 20B are explanatory views showing the molding condition of the conventional laminated blow-molded article.
Figure 20B:
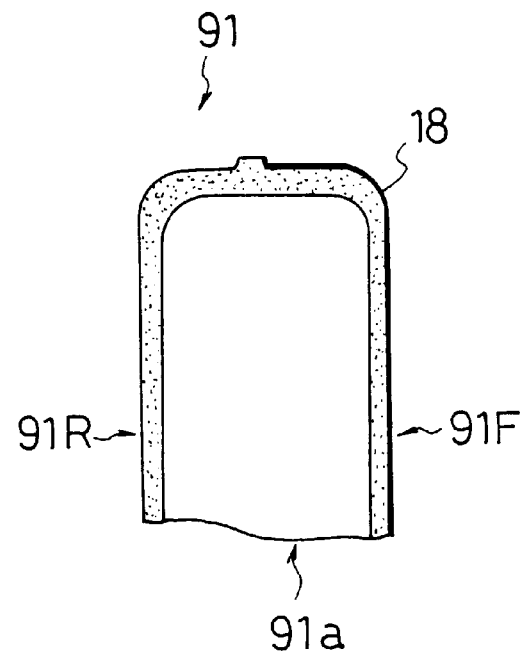

FIG. 17 is a longitudinal sectional view of a blow molding machine, FIGS. 18A, 18B, and 18C are explanatory views showing the process of laminating molding in a method that a burr appears all around the periphery of the article, and FIGS. 19A, 19B, and 19C are explanatory views showing the process of laminating molding for a small-diameter parison whereby no burr appears.

A blow molding method used in the blow molding machine will be described as follows.

First, the mold is held in the opened state. Then, the resin sheet 18 which is previously cut in a predetermined size is temporarily bounded to a mold-line surface of an outer edge portion 15b of the mold piece 8 by, for example, a pressure sensitive adhesive double coated tape (FIG. 18A).

The resin sheet 18 is preferably cut in a length so that when the mold 8 is closed and the resin sheet 18 is pressed along the cavity face 16 of the mold as shown in FIG. 18 B, the upper, lower, left and right ends of the resin sheet 18 are positioned near the mold line but not to touch the mold line (FIG. 18C).

In FIGS. 18A through 18C, the laminating molding is performed in a method that a burr appears all around the periphery of the article. In this method, a parison 19, being relatively large to the mold 8, on which the resin sheet 18 is laminated is used and is extruded from the lower end of the die head 2 by, for example, an extruder. On the other hand, the mold pieces 8, 8 are heated along either of the temperature curve A or B shown in FIG. 4.

After that, by closing the mold to integrate the parison 19 and the resin sheet 18, the temperature about the cavity face 16 of the mold pieces 8, 8 becomes to the softening temperature of the resin sheet 18 so that the surface of the resin sheet 18 is softened and pressed to the cavity face 16 of the mold to transfer the cavity face 16 to the resin sheet 18 and the surface of the parison 19 and the surface of the resin sheet 18 are pressed each other to be integrated by pressurized air blown into the parison 19 through a blow pin.

In FIGS. 19A, 19B, and 19C, the laminating molding is performed in a method using a parison 19, being relatively small to the mold 8, on which the resin sheet 18 is laminated so that no part of the parison 19 is pressed out from the outer edges 15a and 15b when the mold is closed.

FIG. 18C and FIG. 19C show laminated molded articles 90, 91, respectively, in which the resin sheets 18 are laminated on surfaces of the base materials 90a, 91a so that the upper ends of the resin sheets 18 are positioned a little before the mold lines 8D. 90R, 91R indicate rear sides of the molded articles 90, 91, and 90F, 91F indicate front sides, respectively.

As mentioned above, the resin sheet having more than 1 fine hole and less than 500 fine holes per an area of 100 cm$^2$ thereof formed by punching, the diameter of which between 0.1 mm and 1 mm, and projections as burrs of the fine holes formed by punching, is positioned so that the side of the resin sheet 18 on which the projections are formed faces the cavity face of the mold, and then the mold is closed with the resin sheet being held between the cavity face and the surface of the parison. At the same time, the mold is heated to a temperature exceeding the softening temperature of the resin sheet so that the resin sheet is softened. In this state, the resin sheet is laminated on the parison so that the resin sheet is not damaged and fits to the curved inner surface of the cavity without track of holes on the surface thereof, thereby obtaining a laminated blow-molded article with high glossiness and high transfer characteristics.

The color of the resin sheet is allowed to be selected, thereby making a multi-colored and multi-layered molded article by a single-layer blow molding machine without changing colors and with lower cost. A resin sheet on which a pattern and/or character are printed widely allows a variety of design.

Since the mold is heated and cooled during molding, the surface of the resin sheet being in contact with the cavity face of the mold is softened or melted, thereby making a good-looking laminated molded article without a step between the edge of the resin sheet and the surface of the parison.

The die lines 43 are formed in the back surface of the resin sheet by the wave-like cutter disposed on the extruder die, thereby improving the anchor effect and thus increasing the bonding strength between the resin sheet and the parison.

Since the die lines 43 are positively formed in the back surface of the resin sheet, the quality control to have a good surface of the resin sheet which is needed conventionally is not necessary, thereby providing a low-cost resin sheet.

Since the mold line of the mold is shifted rearwardly from the center of the molded article in the thickness direction and when closing the mold, burr pressed out from the mold and the resin sheet laminated on the surface of the parison are pressed rearward, the section of the resin sheet is hidden rearwardly not to be noticeable, thereby improving the appearance of the molded article.

Since the resin sheet is preferably cut in a length so that when the resin sheet is held with the parison at a position sifted rearwardly from the center of the molded article in the thickness direction, the upper, lower, left and right ends of the resin sheet are positioned near the mold line but not to touch the mold line, the section of the resin sheet is hidden rearwardly not to be noticeable, thereby improving the appearance of the molded article.

We claim:

1. A laminating blow molding method for making a hollow article, comprising:

extruding a parison from a path between a die head and a core;

placing a resin sheet adjacent an outer surface of the extruded parison;

sandwiching the parison with the resin sheet between a pair of mold pieces constituting a mold while heating the mold to a temperature exceeding softening temperatures of the resin sheet and the parison, the mold having a mold parting line when closed, one of the mold pieces having shifting members along the mold parting line;

closing the mold so that the parison with the resin sheet is held inside the mold;

moving the shifting members to the other of the mold pieces so that side portions of the parison and resin sheet are pinched and moved toward the other of the mold pieces to form and shift pinched portions;

blowing the parison to blow mold the hollow article, the resin sheet being laminated to the hollow article;

cooling the mold to a temperature to take out the hollow article; and taking out the hollow article.

2. A laminating blow molding method as claimed in claim 1, wherein after the mold is closed, the shifting members are moved rearwardly to push the resin sheet rearwardly.

3. A laminating blow molding method as claimed in claim 2, further comprising cutting the pinched portions of the molded article.

4. A laminating blow molding method as claimed in claim 3, wherein the mold line of the mold is formed in a position shifted rearwardly from a center of the molded article.

5. A laminating blow molding method as claimed in claim 4, further comprising inserting a material between a back surface of the resin sheet and a surface of the parison.

* * * * *